United States Patent [19]

Arima et al.

[11] 4,299,173

[45] Nov. 10, 1981

[54] LEVITATION AND GUIDE MECHANISM FOR CURVED TRACK IN INDUCTIVE REPULSION TYPE VEHICLE MAGNETIC LEVITATION AND GUIDE SYSTEM

[75] Inventors: Kazutaka Arima; Yoshiyuki Kitano, both of Tokyo, Japan

[73] Assignee: Japanese National Railways, Tokyo, Japan

[21] Appl. No.: 94,317

[22] Filed: Nov. 14, 1979

[30] Foreign Application Priority Data

Dec. 28, 1978 [JP] Japan .................... 53-161106
Dec. 28, 1978 [JP] Japan .................... 53-161107
Dec. 28, 1978 [JP] Japan .................... 53-161108
Dec. 28, 1978 [JP] Japan .................... 53-161109
Dec. 28, 1978 [JP] Japan .................... 53-161110
Dec. 28, 1978 [JP] Japan .................... 53-161111
Dec. 28, 1978 [JP] Japan .................... 53-161112
Dec. 28, 1978 [JP] Japan .................... 53-161113

[51] Int. Cl.³ .................................. B61B 13/08
[52] U.S. Cl. ........................ 104/284; 104/281; 104/293; 310/12; 318/135
[58] Field of Search ............ 104/130.1, 281–285, 104/287, 290, 292, 293; 191/10; 310/12–14; 318/38, 135, 687

[56] References Cited

U.S. PATENT DOCUMENTS 3,828,686  8/1974  Steenbeck et al. ............ 104/130.1
3,913,493  10/1975 Maki et al. ..................... 104/281
4,055,123  10/1977 Heidelberg ................... 104/282 X

*Primary Examiner*—Randolph A. Reese
*Attorney, Agent, or Firm*—Wenderoth, Lind & Ponack

[57] ABSTRACT

An improvement in an inductive repulsion type vehicle magnetic levitation and guide system for a curved track in which the vehicle is levitated by an electromagnetic force generated between levitation conductors having the same time constant and laid in two parallel rows on the ground at specific intervals in the direction of travel of the vehicle and levitation superconductive magnets on the vehicle capable of being electromagnetically coupled with the levitation conductors, the magnets being opposed to the levitation conductors at a specific distance from the levitation conductors. The vehicle is guided by an electromagnetic force generated between guide conductors having the same time constant successively positioned at specific intervals in the direction of travel of the vehicle and guide superconductive magnets mounted on the vehicle opposed to the guide conductors at a specific distance from the guide conductors. The electromagnetic force generated between the levitation superconductive magnets and the levitation conductors or between the guide superconductive magnet and the guide conductor on one side of a curved track is made larger than the similar force generated on the other side of the curved tracks, and the differential force counteracts the centrifugal force acting on the vehicle running over the curved track, thus stabilizing the vehicle running at high speed along the curved track.

10 Claims, 22 Drawing Figures

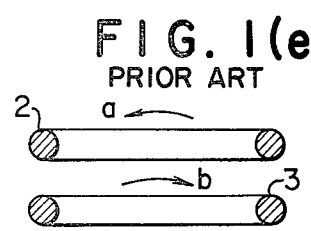
FIG. I(e) PRIOR ART
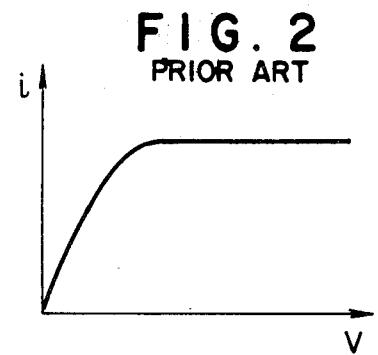
FIG. 2 PRIOR ART
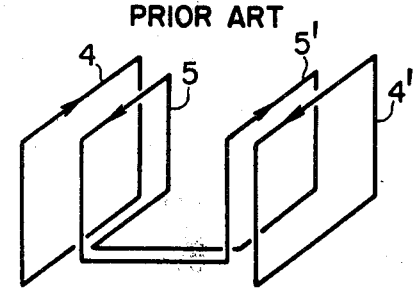
FIG. 4 PRIOR ART
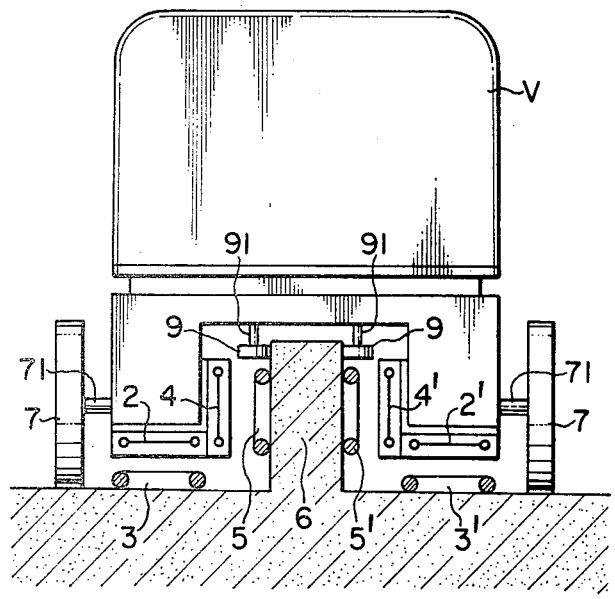
FIG. 3 PRIOR ART

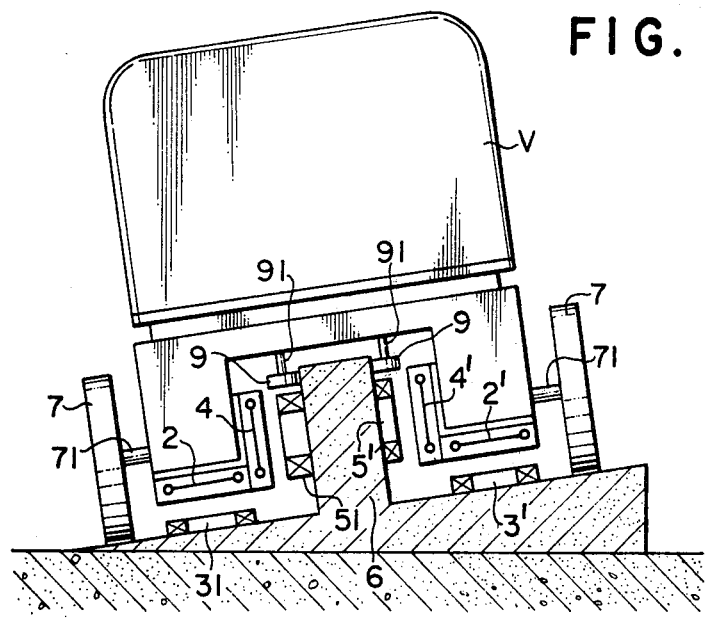
FIG. 5
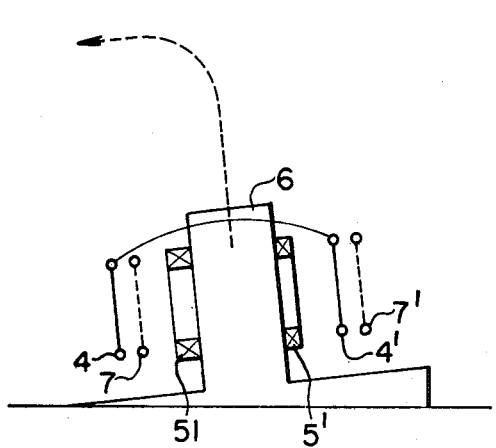
FIG. 6(a)
FIG. 6(b)

LEVITATION AND GUIDE MECHANISM FOR CURVED TRACK IN INDUCTIVE REPULSION TYPE VEHICLE MAGNETIC LEVITATION AND GUIDE SYSTEM

DESCRIPTION OF PRIOR ART

Inductive repulsion type magnetic levitation and guide systems for vehicles are well-known. One example is illustrated in FIGS. 1(a)–1(e) and 2.

In FIG. 1(a), superconductive magnets 2 and 2' with loop conductors are carried on the underside of the vehicle in two parallel rows at specific intervals in the direction of travel of the train. Adjacent superconductive magnets in the rows are normally opposite in polarity to each other.

Opposed to the superconductive magnets 2 and 2' and installed on the track are two rows of normal conductive loop coils or sheets 3 and 3' successively positioned along the track at specific intervals in the direction of travel of the train positioned such that electromagnetic induction can take place between the coils 3 and 3' and the magnets 2 and 2' respectively.

In this arrangement, however, no electromagnetic action will take place between the superconductive magnets 2 and 2' on the vehicle and the conductors 3 and 3' on the ground while the vehicle is at rest. The vehicle is driven by a well-known linear motor. Thereupon the superconductive magnets 2 and 2' move along above the opposed conductors 3 and 3' and thus an electric current in induced in the conductors 3 and 3' by said superconductive magnets 2 and 2'. The induced current increases as the running speed of the vehicle increases. The current almost saturates at, say, 200 Km/h, and the current is maintained at this level as long as the vehicle runs at 200 Km/h or more. Namely, a magnetic flux $\phi$ as illustrated in FIG. 1(b), which corresponds positionally to FIG. 1(a), develops in the conductors 3 and 3', and at the same time a voltage e builds up as illustrated in FIG. 1(c), which corresponds positionally to FIG. 1(a), whereby a current i as illustrated in FIG. 1(d) flows. It is well-known that the current flowing in the first loop conductor is opposite in direction to the current induced in the second loop conductor opposed to the first loop conductor. Therefore if the current in the superconductive magnet 2 flows in the direction of arrow a in FIG. 1(e), the current induced in the conductive loop 3 will flow in the direction b. Thus according to Fleming's lefthand law, the levitation force $F + Bxi$ is produced, where B is the magnetic flux density generated by the superconductive magnets 2 and 2' and i is the current flowing in the conductors 3 and 3'. Thus the vehicle is levitated by the repulsion force of the superconductive magnets 2 and 2' due to the current in the conductors 3 and 3'.

In this system of vehicle levitation, the operations of the vehicle such as powering, coasting, braking and halting are carried out by a known linear motor.

One example of a motor of this type for vehicle propulsion is a ground-primary linear synchronous motor system. The fundamental principle on which this system operates is such that the relative position of a running vehicle to the ground conductors successively positioned at specified intervals in the direction of travel of the vehicle is determined by detectors on the vehicle and on the ground along the track, and as the vehicle moves the ground conductors are successively energized to create a movable magnetic field. When the movable magnetic field is intersected by the magnetic flux of the superconductive magnet on the vehicle, a force to propel the vehicle will be generated according to Fleming's lefthand law.

When the vehicle is driven and starts to run, a levitation force is developed by the interaction between the superconductive magnets 2 and 2' and the conductors 3 and 3' and after a certain speed is attained, as illustrated in FIG. 2, the levitation force is maintained nearly constant and the vehicle can be operated with a constant levitation force. When the speed drops below this certain value, the levitation force diminishes, and as the vehicle decelerates due to the application of a brake, it finally lands on wheels or other auxiliary supports on a running path or the like.

FIG. 3 illustrates one example of a levitation and guide system for vehicle levitation and guidance by inductive repulsion.

Levitation superconductive magnets 2 and 2' are mounted under the body of vehicle V and levitation conductors 3 and 3' are positioned successively along the track in the direction of travel of the train and opposed to said levitation superconductive magnets 2 and 2', the relative positions being as illustrated in FIG. 1.

Guide conductors 5 and 5' i.e. conductive loop coils or sheets, are successively positioned on both sides of the guide 6 which extends along the ground in the direction of travel of the train. Guide superconductive magnets 4 and 4' are mounted on the vehicle V and are electromagnetically coupled with the corresponding guide conductors 5 and 5'. The running vehicle is guided by the electromagnetic force developed between the guide conductors 5 and 5' and the guide superconductive magnets 4 and 4'.

In the embodiment illustrated in FIG. 3, the guide conductors 5 and 5' are also utilized as the ground conductors for propulsion and the guide superconductive magnets 4 and 4' are also utilized as the superconductive magnets for propulsion. Thus the conductors 5 and 5' have to be successively energized, as described above, to generate a vehicle-propelling force during the progress of the vehicle, and this also causes them to carry out their guiding function. Auxiliary support wheels 7 (for example rubber tires) are mounted on axles 71 on the vehicle V so that, when the vehicle speed exceeds, say 200 Km/h, the speed detection signal causes said wheels to be lifted from the ground. Auxiliary guides 9 are mounted on axles 91 on the vehicles and are in the form of wheels which rotate in contact with the side surface of the guide 6. These can also be rubber tires. Upon attainment of say, over 200 Km/h, they are moved out of contact with the side surface of the guide 6.

In the prior art the interval between the levitation magnets 2 and 2' and the corresponding levitation conductors 3 and 3' are the same, and all the levitation conductors on the ground have the same time constant. This time constant is expressed by L/R, where L is the inductance of a given conductor and R is its resistance. Therefore, when the vehicle runs on a flat, straight track, the levitation force developed between the parallel conductors on the ground and the opposed superconductive magnets on the vehicle ought to be constant.

In the guide mechanism, the cross-sectional areas of the guide superconductive magnets 4 and 4' are the same, and the distances between the guide magnets 4 and 4' and the corresponding guide conductors 5 and 5' are the same. As indicated in FIG. 4, these magnets are null-flex coupled. Where the magnetic fluxes induced across the guide conductors 5 and 5' by the guide superconductive magnets 4 and 4' respectively are $\phi g$, and $\phi g'$, when there is no lateral displacement of the vehicle then $\phi g = \phi g'$. Accordingly the magnetic flux for one pair of coils will be $\phi g - \phi g' = 0$, which means no guide force is developed. When, however, the vehicle is laterally displaced, then $\phi g > \phi g'$ (if the vehicle displacement is rightward) or $\phi g > \phi g'$ (if the vehicle displacement is leftward). Thus the magnetic flux for one pair of coils will be $\phi g - \phi g' = \pm \Delta \phi g'$, which means that a guide force proportional to the displacement is developed and it acts in the opposite direction to the displacement and counteracts the displacement.

The above-described system of levitation and guidance can be exceedingly effective for a vehicle running on a flat, straight track. When the vehicle runs along a curved track, however, a centrifugal force develops depending on the radius of curvature and the weight and speed of the vehicle, and as a consequence the vehicle deviates from the center of the track. For this reason, the track at such a curve should be inclined downwardly toward the inside or otherwise a derailment or overturning of the vehicle is likely to occur. Thus it is the conventional practice to bank the rails of a curved track for prevention of this type of accident. The amount of inclination depends on the speed of the vehicle for which the curve is designed. It would be ideal to set the inclination such that the resultant of the gravity and centrifugal force acting on the vehicle as it runs along the curve is normal to the track plane. The inclination should be set such that the vehicle can run along the curve at various speeds, but an excessive inclination should not be given lest the vehicle overturn toward the inside of the curve when it halts on the curve. Therefore, when a vehicle runs at too high a speed along the curve, the centrifugal force becomes too large and the condition known as "cant deficiency" occurs, whereby a heavy centrifugal force acts on the vehicle tending to cause it to deviate from the center of the track. This is very dangerous, particularly for a high speed levitation and guide system.

OBJECT AND BRIEF SUMMARY OF THE INVENTION

The primary object of the present invention is to make possible the stable high speed passage of a vehicle along a curved track by providing an inductive repulsion type levitation and guide mechanism for the vehicle in which an electromagnetic force is generated which counteracts the centrifugal force developed when the vehicle passes along the curved track.

Another object of the present invention is to make possible the stable high speed passage of a vehicle along a curved track by making the electromagnetic force or sum of electromagnetic forces developed between the guide superconductive magnets and the guide conductors and/or between the levitation superconductive magnets and levitation conductors on one side of a curved track larger than the similar force and/or sum of forces developed on the other side of the track, the difference between said electromagnetic forces on the two sides acting to counteract the centrifugal force developed in the vehicle running along the curved track.

The other objects, features and advantages of the present invention will become more apparent from the following detailed description made in conjunction with the attached drawings.

BRIEF DESCRIPTION OF THE DRAWINGS

FIGS. 1(a)–(e) and 2 are diagrams for explaining the working principle of the inductive repulsion type magnetic levitation vehicle, FIG. 1(a) being a perspective view showing the relation between the superconductive magnets on the vehicle and the conductive coils on the ground, FIG. 1(b) being a diagram showing the magnetic flux induced in the levitation conductor of FIG. 1(a), FIG. 1(c) being a diagram showing the voltage generated by the magnetic flux of FIG. 1(b), FIG. 1(d) being a diagram showing the current generated by the voltage of FIG. 1(c), and FIG. 1(e) being a sectional view illustrating the direction of the current induced between the levitation superconductive magnet on the vehicle and the levitation conductor on the ground;

FIG. 2 is a graph of the relation between the running speed and levitation of an inductive repulsion type magnetic levitation vehicle;

FIG. 3 is a transverse sectional view illustrating one example of a conventional magnetic levitation vehicle;

FIG. 4 is a diagram showing the electromagnetic coupling between the guide conductor on the ground and the guide superconductive magnet on the vehicle in the magnetic guide system of FIG. 3;

FIG. 5 is a transverse sectional view of one embodiment of the present invention;

FIG. 6(a) is a diagrammatic transverse view for explaining the working principle in the embodiment of FIG. 5;

FIG. 6(b) is a diagrammatic plan view corresponding to FIG. 5;

DETAILED DESCRIPTION OF THE INVENTION

In the various embodiments, like reference numbers denote like elements. Reference numbers the same as those used in FIGS. 1–4 denote the same elements as in these figures.

The first embodiment will now be described with reference to FIGS. 5 to 6(b).

The embodiment is the same as that shown in FIG. 3 except that the guide conductor 51 on the inside surface of the guide 6 at the curved part of the track has a larger time constant than that of the guide conductor 5' on the outside surface of guide 6 symmetrical with the longitudinal axis of the guide 6. The difference in the time constant counteracts the centrifugal force which acts on a vehicle passing over the curved track tending to displace it in an outward direction.

As described above, the time constant for the conductor is expressed by L/R, where L and R are the inductance and the resistance, respectively, of the conductor.

The value of the time constant for the guide conductor can be increased either by increasing the cross-sectional area of the related conductor loop or by providing an additional conductive loop or sheet with a desired thickness.

As described above, in the prior art inductive repulsion type magnetic levitation vehicle, all the levitation conductors and all the guide conductors have the same time constant, and the distance between the levitation superconductive magnet and the levitation conductor and between the guide superconductive magnet and the guide conductor are the same. Therefore, in the embodiment of FIGS. 5 and 6 where the track is curved to the left, a rightward centrifugal force acts on the vehicle and thereby the guide superconductive magnets 4 and 4' on the vehicle tend, as indicated in FIG. 6(a), to move to the right, i.e. outwards of the curved track tending to reduce the gap between the guide superconductive magnet 4 on the vehicle and the guide conductor 51 on the inside of guide 6 and tending to increase the gap between the guide conductor 5' on the outside of the guide 6 and the guide superconductive magnet 4', with the result that the vehicle tends to deviate rightward or toward the outside of the curved track.

According to the present invention, by giving the inside guide conductor 51 a time constant larger than the time constant for the outside guide conductor 5' the centrifugal force developed and acting to displace the vehicle to the right can be almost nullified. Thus the vehicle can negotiate the curve without deviating from the track axis. In this way the present invention provides a simple solution to the above described problem.

Figure 1:
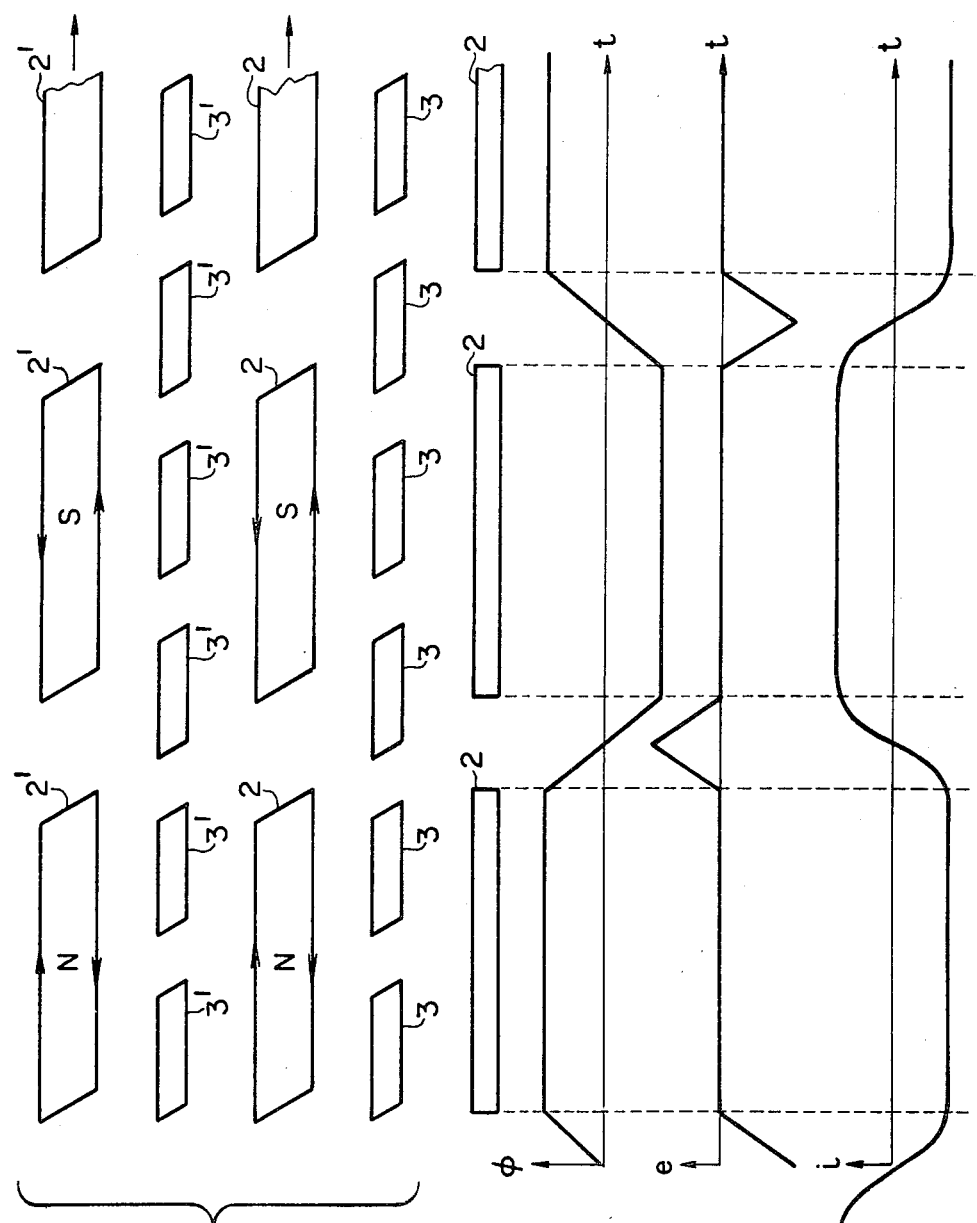
Figure 7:
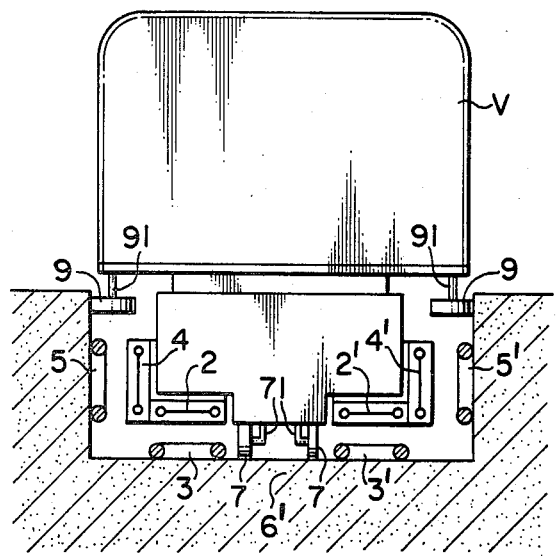
FIG. 7 is a transverse sectional view of a different type of magnetic guide system for an inductive repulsion type magnet levitation vehicle.
Figure 8:
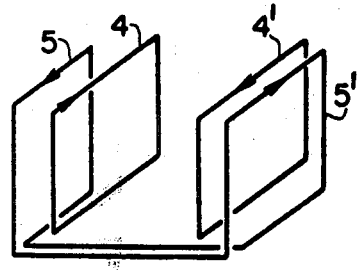
FIG. 8 is a diagram showing the electromagnetic coupling between the guide conductor and the guide superconductive magnet in the magnetic guide system of FIG. 7.

FIGS. 7 and 8 illustrate a different inductive repulsion type magnetic levitation and guide mechanism from that illustrated in FIGS. 3 and 4.

In FIG. 7, the guide conductors 5 and 5', i.e., conductive loop coils or sheets, are successively positioned along both side walls of the guide channel 6' installed on the ground in the direction of travel of the vehicle. Guide superconductive magnets 4 and 4' are mounted on the vehicle opposed to and electromagnetically coupled with the corresponding guide conductors 5 and 5'. Thus the running vehicle is guided by the electromagnetic force developed between the guide conductors 5 and 5' on the ground and the guide superconductive magnets 4 and 4' in the same manner as described in connection with FIGS. 3 and 5. The magnetic levitation of the vehicle is carried out in the same manner as described in connection with FIGS. 3 and 5 by the electromagnetic force acting between the levitation superconductive magnets 2 and 2' on the vehicle and the levitation conductors 3 and 3' on the ground.

Figure 9:
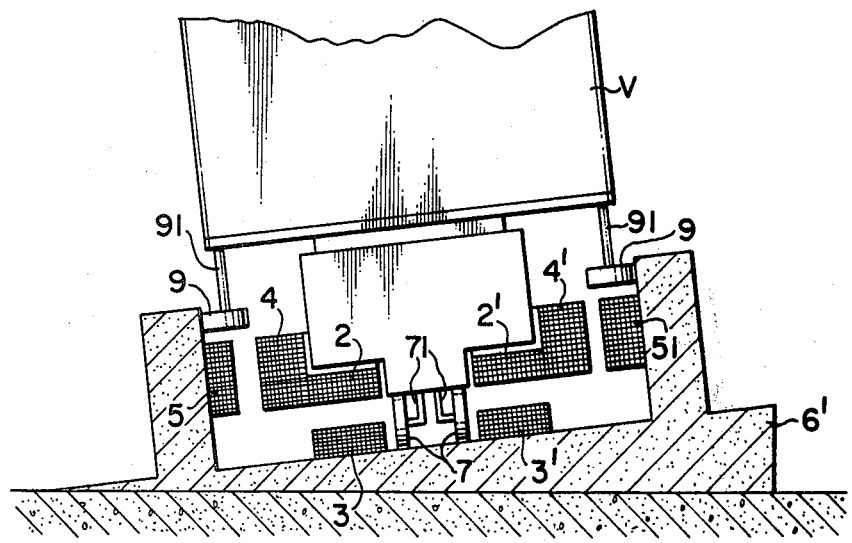
FIG. 9 is a partial transverse sectional view of a second embodiment of the present invention.
Figure 10:
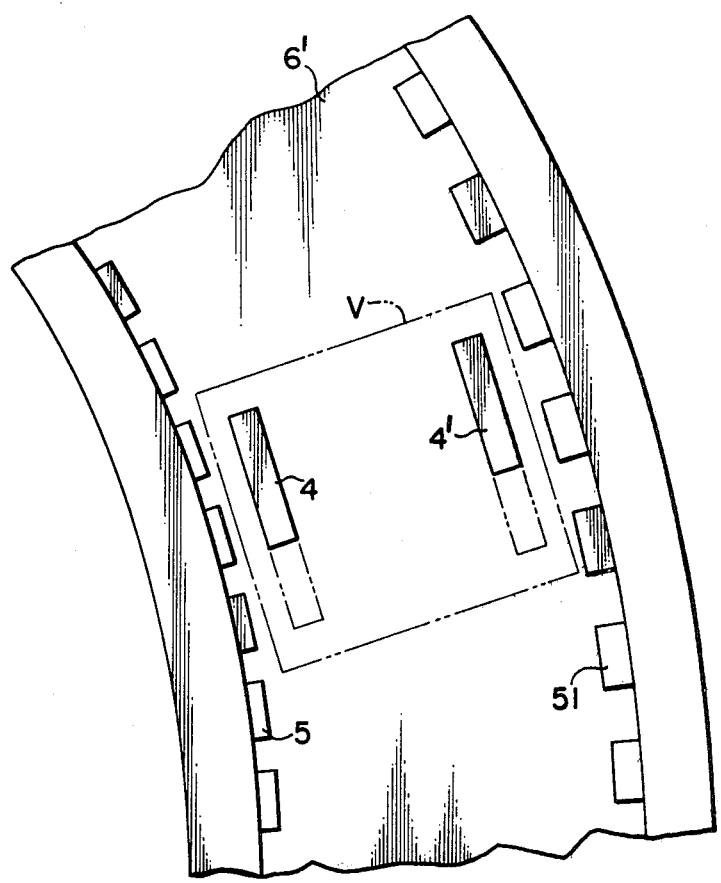
FIG. 10 is a diagrammatic plan view for explaining the principle of operation of the embodiment of FIG. 9.

In this system too, all the guide superconductive magnets and all the guide conductors as well as all the levitation conductors have the same time constant; the gaps between the guide superconductive magnet and the guide conductor and between the levitation superconductive magnet and the levitation conductor are the same; and as indicated in FIG. 8, the guide superconductive magnet and the guide conductor are null-flux coupled. Thus, with this system the same problem exists as described in connection with FIG. 3. In the second embodiment, as illustrated in FIGS. 9 and 10, the guide conductor 51 located on the wall of the guide channel 6' on the outside of the curve of the curved track has a time constant larger than the time constant for the guide conductor 5 located on the wall of the guide channel 6 on the inside of the curve of the curved track and the difference between these two time constants counteracts the centrifugal force acting on a vehicle passing over the curved track tending to cause it to move outward. The increased value of the time constant of the guide conductor can be provided in the same way as described in connection with the first embodiment.

Figure 11:
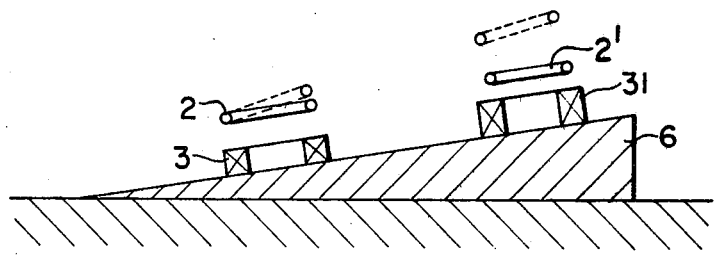
FIG. 11 is a diagrammatic transverse section of a third embodiment of the present invention.
Figure 12:
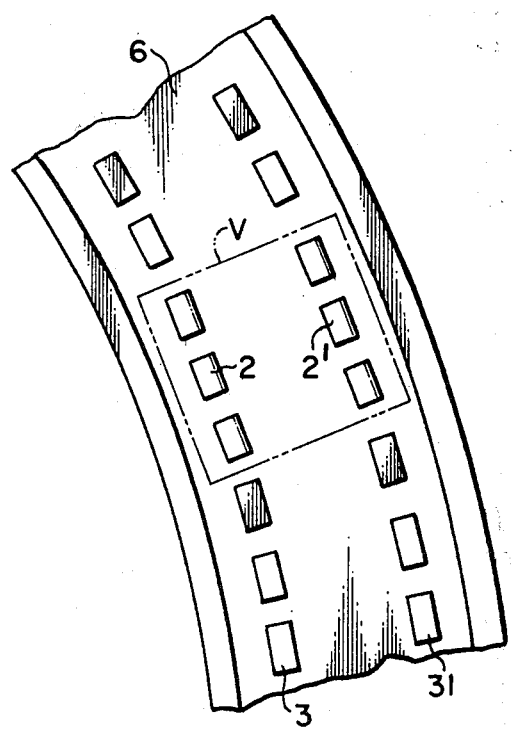
FIG. 12 is a plan view corresponding to FIG. 11.

FIGS. 11 and 12 illustrate a third embodiment, in which one levitation conductor has a time constant larger than the time constant for the other levitation conductor, thereby achieving the same effect as in the first and second embodiments. For example, the levitation conductor 31 located on the outside of the curve has a time constant larger than the time constant for the levitation conductor 3 located adjacent to said conductor 31 on the inside of the curve.

Thus the electromagnetic levitation force between the superconductive magnet 2' on the vehicle and the levitation conductor 31 becomes larger than levitation electromagnetic force working between the superconductive magnet 2 on the vehicle and the levitation conductor 3 and, in consequence, the levitation force acting on the superconductive magnet 2' becomes larger than that acting on the superconductive magnet 2 as shown in the dotted lines, so that the vehicle will be tilted toward the inside of a curve thereby counteracting the centrifugal force acting on the vehicle tending to make the vehicle unstable in the lateral direction when a cant deficiency occurs. Thus, by appropriately increasing the time constant of the levitation conductor 31, the cant deficiency can be compensated for and the vehicle can be operated safely at high speed over the curved track.

Figure 13:
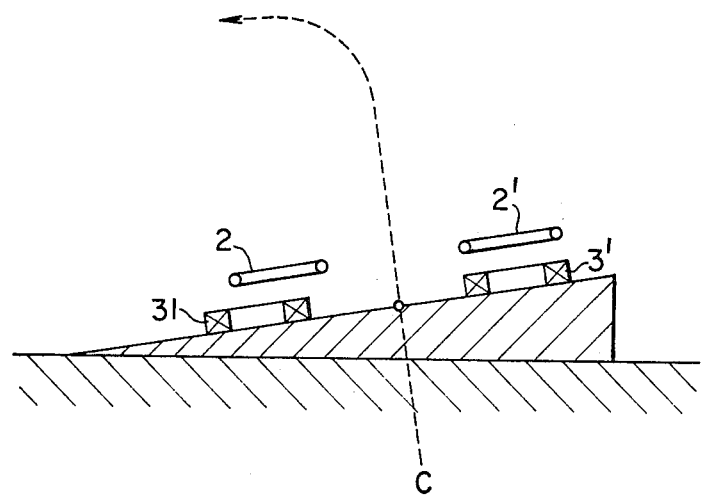
FIG. 13 is a view similar to FIG. 11 of a fourth embodiment of the present invention.

FIG. 13 illustrates the fourth embodiment. In this embodiment the desired result is achieved by providing the levitation conductors on both sides of the centerline of the track with the same time constant and appropriately changing the relation between the levitation conductor on the inside of the curve and the opposed levitation superconductive magnet. Namely, the levitation conductor 3' located on the outside of the curve is positioned in the same manner as shown in FIGS. 3 and 5, i.e. directly opposed to the levitation superconductive magnet 2' on the vehicle, but the levitation conductor 31 located on the inside of the curve is placed inside, i.e. to the left in FIG. 13, of the usual distance from the center of the curve. The distance between the longitudinal axis C of the curved track and the conductor 31 is larger than the distance between axis C and the conductor 3'.

Thus, the electromagnetic levitation force between the levitation superconductive magnet 2 and the levitation conductor 31 becomes smaller than the electromagnetic levitation force between the levitation superconductive magnet 2' and the levitation conductor 3', and consequently the vehicle is tilted toward the inside of the curve and the centrifugal force acting on the vehicle moving along the curve is counteracted so that the vehicle is not unstable in the lateral direction when cant deficiency occurs. Therefore, if the levitation conductor 31 is appropriately offset with respect to the levitation magnet 2, the cant deficiency will be duly compensated for and the vehicle will be able to run safely at high speed over the curved track. In this embodiment the conductor 31 is shifted to the left in FIG. 13, but shifting it to the right will also produce the same effect. In this embodiment, if the levitation conductor 3' on the outside has a time constant appropriately larger than the time constant for the levitation conductor 31 on the inside and at the same time the conductor 31 is offset, the electromagnetic force acting between the levitation magnet 2 on the vehicle and the levitation conductor 31 on the ground can be made appropriately smaller than the force acting between the magnet 2' and the conductor 3', thereby producing the same effect of compensating for a cant deficiency.

Since the embodiments of FIGS. 11 and 12 and FIG. 13 relate to the levitation conductor or magnet, they can be applied to the levitation and guide mechanism of the type shown in FIGS. 3 and 4 as well as the type shown in FIGS. 7 and 8.

Figure 14:
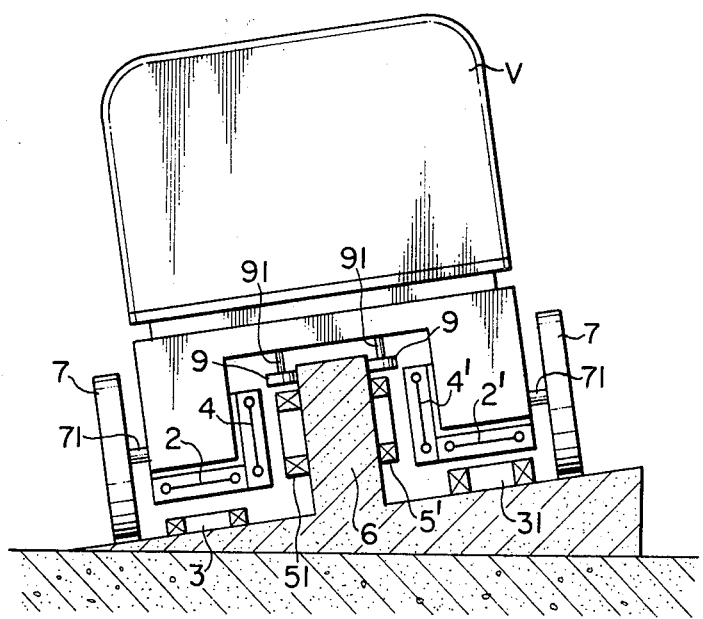
FIG. 14 is a transverse sectional view of a fifth embodiment of the present invention.

FIG. 14 illustrates the fifth embodiment. Applied to the type of levitation and guide mechanism shown in FIGS. 3 and 4, this embodiment represents a combination of the first embodiment illustrated in FIGS. 5 and 6 and the third embodiment illustrated in FIG. 11.

In this embodiment, the levitation conductor 31 on the outside of the curve has a time constant larger than the time constant of the levitation conductor 3 located adjacent thereto on the inside of the curve, while at the same time the guide conductor 51 on the inside of the curve has a time constant larger than the time constant of the guide conductor 5' on the outside of the curve.

In this embodiment, the levitation force acting between the magnet 2' on the vehicle and the conductor 31 on the ground is stronger than the force acting between the magnet 2 on the vehicle and the conductor 3 on the ground, while at the same time the time constant for the guide conductor 51 on the inside of the curve is larger than the time constant for the guide conductor 5' on the outside of the curve. Therefore, the levitation conductor 31 and the guide conductor 51 cooperate to counteract the centrifugal force and the vehicle will run along the axis of the track in the curve and the cant deficiency will be compensated for.

Figure 15:
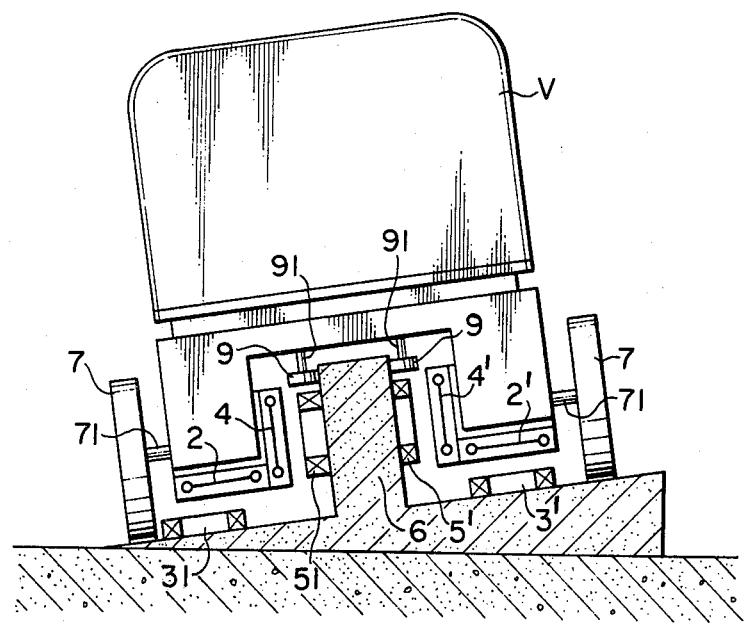
FIG. 15 is a transverse sectional view of a sixth embodiment of the present invention.

FIG. 15 illustrates the sixth embodiment. This is also applicable to the type of levitation and guide mechanism shown in FIG. 3, and is a combination of the first embodiment shown in FIG. 5 and the fourth embodiment shown in FIG. 13.

In this embodiment the levitation conductor 3' on the outside of the curve is, as illustrated in FIGS. 3 and 5, vertically opposed to the magnet 2' on the vehicle, but the levitation conductor 31 on the inside of the curve is offset, to the left in FIG. 15, from the position opposed to the magnet 2, i.e. appropriately offset toward the inside of the curve with the distance between the axis of the curved track and the conductor 31 being larger than the distance between said axis and the conductor 3'. In addition, the guide conductor 51 on the inside of the curve has a time constant larger than the time constant of the guide conductor 5' on the outside of the curve.

With such an arrangement, the force acting between the magnet 2 on the vehicle and the conductor 31 on the ground is less than the force acting between the magnet 2' on the vehicle and the conductor 3'. In addition, because the time constant for the guide conductor 51 on the inside of the curve is larger than the time constant for the guide conductor 5' on the outside of the curve, there is a force on the vehicle toward the inside of the curve. These two effects combine to counteract the centrifugal force acting on the vehicle passing through the curve and almost nullifies it, thereby compensating for cant deficiency.

Figure 16:
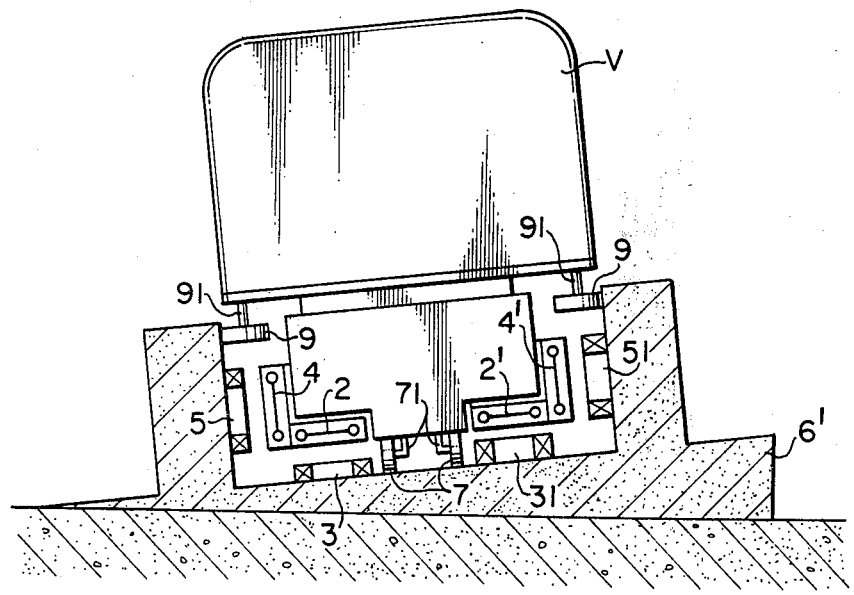
FIG. 16 is a transverse sectional view of a seventh embodiment of the present invention.

FIG. 16 is an illustration of the seventh embodiment which represents application of the fifth embodiment to the levitation and guide mechanism shown in FIGS. 7 and 8.

In this embodiment the levitation conductor 31 on the outside of the curve has a time constant larger than the time constant of the levitation conductor 3 on the inside of the curve, and the guide conductor 51 provided on the outside of the guide channel 6' on the outside of the curve has a time constant larger than the time constant for the guide conductor 5 on the inside of the curve. Since the time constant for the levitation conductor 31 is larger than the time constant for the levitation conductor 3, the levitation force developed between the magnet 2' on the vehicle and the conductor 31 will be stronger than the levitation force developed between the magnet 2 on the vehicle and the conductor 3, thereby causing the vehicle to tilt toward the inside of the curve. Since the time constant for the outside guide conductor 51 is larger than the time constant for the inside guide conductor 5 there is a force on the vehicle toward the inside of the curve. These two effects combine to counteract the centrifugal force acting on the vehicle passing through the curve almost nullifing it. The same effect as is obtained in the fifth embodiment can be obtained by giving the time constants of the relevant conductors appropriate values.

Figure 17:
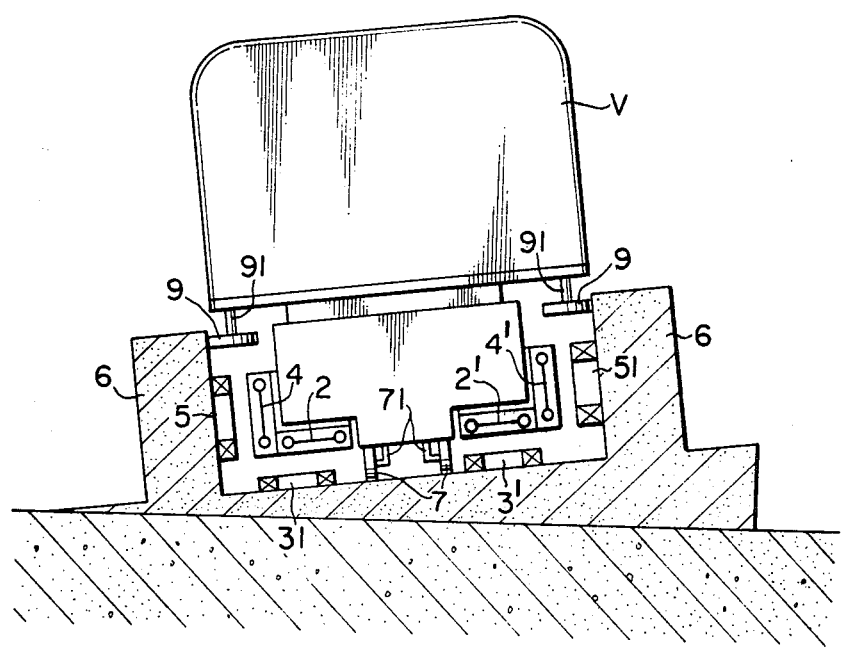
FIG. 17 is a transverse sectional view of an eighth embodiment of the present invention.

FIG. 17 illustrates the eighth embodiment. This embodiment is also applicable to a levitation and guide mechanism of the type shown in FIGS. 7 and 8. Unlike the arrangement in the seventh embodiment where the time constant for the outside levitation conductor is larger than the time constant for the inside conductor, in this embodiment the time constant for the levitation conductors are the same and the inside levitation conductor 31 is offset relative to the magnet 2 on the vehicle; otherwise this embodiment is the same as the seventh embodiment. The outside levitation conductor 3' is placed, just as in FIGS. 7 and 8, directly opposed to the magnet 2' on the vehicle, but the inside levitation conductor 31 is shifted to the left in FIG. 18, that is, appropriately offset toward the inside of the curve, so that the distance between the axis of the curved track and the conductor 31 is larger than the distance between said axis and the conductor 3'. The guide conductor 51 on the outside of the curve also has a time constant larger than the time constant for the guide conductor 5 on the inside of the curve.

Thus the levitation force developed between the magnet 2 and the conductor 31 will be less than the levitation force developed between the magnet 2' and the conductor 3' so that the vehicle will tend to be tilted toward the inside of the curve. The time constant for the outside guide conductor 51 being larger than the time constant for the inside guide conductor 5, there is a force exerted on the vehicle toward the inside of the curve. These two effects combine to counteract the centrifugal force urging the vehicle to the right so that it is almost nullified. Thus the object of the invention is achieved by this embodiment just as well as in the seventh embodiment.

What is claimed is:

1. An inductive repulsion type magnetic vehicle levitation and guide system, comprising: two parallel rows of levitation conductors having a predetermined time constant with said conductors being at specific intervals along a track in the direction of travel of the vehicle; levitation superconductive magnets mounted on the vehicle in spaced opposed relation to said conductors and electromagnetically coupled with said conductors for levitating the vehicle by the electromagnetic force developed between said conductors and said magnets; guide means extending along the track in the direction of travel of the vehicle; guide conductors having a predetermined time constant and positioned in parallel on said guide means in the direction of travel of the vehicle; corresponding guide superconductive magnets mounted on the vehicle in spaced opposed relation to said guide conductors, said levitation magnets and levitation conductors and guide magnets and the guide conductors along a curved portion of the track being electromagnetically related for producing an electromagnetic repulsive force between at least one magnet and one conductor which is different from the electromagnetic repulsive force between the corresponding magnets and the corresponding conductors on the straight portion of the track and which is in a direction for counteracting the centrifugal force acting on the vehicle passing through the curved portion of the track.

2. A system as claimed in claim 1 in which said one conductor has a larger time constant than the time constant of the corresponding conductors on the straight portion of the track.

3. A system as claimed in claim 2 in which said guide means is a center guide extending along the central axis of the track, and said guide conductors are on the inside and outside surfaces of said center guide, the guide conductors on the inside of said center guide along the curved portion of the track having the larger time constant.

4. A system as claimed in claim 2 in which said guide means is a center guide extending along the central axis of the track, and said guide conductors are on the inside and the outside surfaces of said center guide, the guide conductors on the inside of said center guide along the curved portion of the track having the larger time constant, and the levitation conductors being positioned on both sides of said center guide and the levitation conductors on the outside of said center guide along the curved portion of the track having the larger time constant.

5. A system as claimed in claim 2 in which said guide means is a channel means extending along the track with opposed walls facing each other, and said guide conductors are on the opposed walls of said channel means, the guide conductors on the outside wall of the channel means along the curved portion of the track having the larger time constant.

6. A system as claimed in claim 2 in which said guide means is a channel means extending along the track with opposed walls facing each other, and said guide conductors are on the opposed walls of said channel means, the guide conductors on the outside wall of the channel means along the curved portion of the track having the larger time constant, and the levitation conductors being positioned on the bottom of the channel means and the levitation conductors toward the outside of the channel means along the curved portion of the track having the larger time constant.

7. A system as claimed in claim 1 in which said one conductor is the levitation conductor along the inside of the curve of the curved portion of the track, and is laterally offset from the opposed levitation superconductive magnet.

8. A system as claimed in claim 1 in which said one conductor has a larger time constant than the time constant of the corresponding conductors on the straight portion of the track and one levitation conductor along the inside of the curve of the curved portion of the track is laterally offset from the opposed levitation superconductive magnet.

9. A system as claimed in claim 8 in which said guide means is a center guide extending along the central axis of the track, and said guide conductors are on the inside and outside surfaces of said center guide, the guide conductors on the inside of said center guide along the curved portion of the track having the larger time constant, and the levitation conductor along the inside of the curve of the curved portion of the track is laterally offset from the opposed levitation superconductive magnet.

10. A system as claimed in claim 8 in which said guide means is a channel means extending along the track with opposed walls facing each other and said guide conductors are on the opposed walls of said channel means, the guide conductors on the outside wall of the channel means along the curved portion of the track having the larger time constant, and the levitation conductor along the inside of the curve of the curved portion of the track being laterally offset from the opposed levitation superconductive magnet.

* * * * *